United States Patent [19]

Olechowski et al.

[11] 4,414,146
[45] Nov. 8, 1983

[54] METHOD OF POLYMERIZING ROSIN

[75] Inventors: Jerome R. Olechowski, Lawrenceville; Nelson E. Lawson, Trenton, both of N.J.

[73] Assignee: Union Camp Corporation, Wayne, N.J.

[21] Appl. No.: 374,974

[22] Filed: May 5, 1982

[51] Int. Cl.³ ............................ C09F 1/00; B01J 27/02
[52] U.S. Cl. .................................... 260/97; 260/99.5; 260/97.5; 502/159
[58] Field of Search .................. 260/97, 99.5, 97.5; 252/426

[56] References Cited

U.S. PATENT DOCUMENTS

| | | | |
|---|---|---|---|
| 2,419,185 | 4/1947 | Braidwood et al. | 260/99.5 |
| 3,965,039 | 6/1976 | Chaplitis et al. | 252/426 |
| 4,038,213 | 7/1977 | McClure et al. | 252/426 |
| 4,222,952 | 9/1980 | Vick | 252/426 |
| 4,339,377 | 7/1982 | Hollis | 252/426 |

*Primary Examiner*—John Kight, III
*Assistant Examiner*—M. L. Moore
*Attorney, Agent, or Firm*—Kane, Dalsimer, Kane, Sullivan and Kurucz

[57] ABSTRACT

Polymers having pendant sulfonic acid groups are disclosed as catalysts for polymerizing rosin.

19 Claims, No Drawings

METHOD OF POLYMERIZING ROSIN

BACKGROUND OF THE INVENTION

1. Field of the Invention

The invention relates to methods of polymerizing rosin.

2. Brief Description of the Prior Art

The term "polymerized rosin" refers to the resinous mixture obtained when rosin is treated under various conditions with strong inorganic acids, organic acids or acidic clays. The mixture comprises non-dimerizable resin acids such as dehydroabietic acid, resin acids containing some unsaturation which do not react and a number of different types of polymerized resin acids including dimerized resin acids. The mixture also contains a minor amount of esters, resin acid anhydrides and non-saponifiable substances. Polymerized rosin may be refined, usually by distillation, to remove some portion of the monomeric resin acids and other substances to produce a mixture containing a higher concentration of polymerized resin acids. This refined mixture always has a higher softening point than unrefined polymerized rosin and it is referred to as "dimerized rosin" in many textbooks.

Much prior art exits that bears upon the conversion of rosin to a more polymeric substance. Among the literature descriptions of prior art methods, U.S. Pat. Nos. 2,136,525; 2,108,928; 2,307,641; and 2,328,681 are examples; also the U.S. Pat. Nos. 2,515,218; 2,251,806; 2,532,120 and 4,105,462.

In spite of the many methods which have been described for polymerizing rosin, there are at least two disadvantages which usually attend all processes for polymerizing rosin. First, all of the catalysts known to be operable within a reasonable process time to obtain acceptable yields of dimer suffer from some combination of the following disadvantages. They are corrosive; they evolve corrosive or poisonous fumes; their salts are toxic; they need to be used at high levels; they leave residuals (often chemically bonded contaminants) in the final product; they require processing of rosin at relatively low temperatures; and they require processing of rosin in the presence of large amounts of inert solvent. In regard to the latter two points, rosin when used in production quantities is usually stored in the molten condition at temperatures around 150° C. To dissolve it in solvents for processing at 30° to 60° C. requires considerable cooling (a time consuming step). The rosin may crystallize in the process and all the solvent must be stripped out later (which results in low kettle yields). The second major disadvantage of prior art processes, particularly those which use sulfuric acid, is the separation of an acidic sludge or emulsion during work-up. Tall oil rosin polymerization is especially prone to develop a large acid sludge layer which can be very troublesome. The problem is mentioned specifically by Sinclair et al. in U.S. Pat. No. 3,663,545.

The present invention is an improvement over the prior art in that it permits one to attain a high content of polymerized rosin rapidly using a convenient manufacturing sequence.

A substantial advantage of the method of the invention resides in the class of acid catalyst used to promote the polymerization. This class of acids avoids the disadvantages of other previously used strong acid catalysts. They are heterogeneous catalysts which dimerize even tall oil rosin without the formation of large quantities of acid sludge. They operate at higher temperatures (in the range of 60° to 180° C. but preferably in the range of 90° C. to 150° C.). They can be used at levels as low as 0.01% of acid based on rosin (a level of 1 to 20% is preferred) and can be used in a fast, low temperature process.

Another advantage associated with use of the acid catalysts used in the method of the invention resides in their stability, ease of recovery and re-usability. They are particularly useful in a continuous process for polymerizing a rosin. These and other advantages will be described more fully hereinafter.

SUMMARY OF THE INVENTION

The invention comprises the polymerization of a rosin in the presence of a catalytic proportion of an insoluble catalyst which comprises a polymer having pendant organosulfonic acid groups. The term "insoluble" as used here means insoluble in the polymerization reaction mixture under conditions of polymerization.

DETAILED DESCRIPTION OF THE INVENTION

The method of the invention is based in-part on the discovery that insoluble polymers, which may be organic or inorganic in nature, and having pendant sulfonic acid groups are effective catalysts for promoting the polymerization of rosin. Representative of such catalysts are the sulfonated styrene-divinylbenzene copolymers represented by recurring units of the general formula:

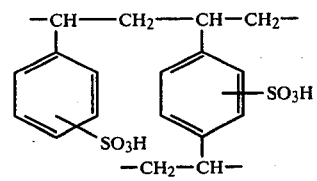

Such copolymers are well known as is the method of their preparation. They are also commercially available under the tradename Amberlite and Amberlyst (Rohm and Haas, Philadelphia, Pa.). Preferably they are employed in their macroreticular resin forms. Preferred catalysts are also represented by those selected from polymeric fluorocarbons containing a repeating or recurring group selected from the formulae consisting of:

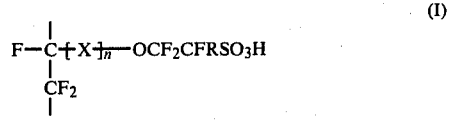
(I)

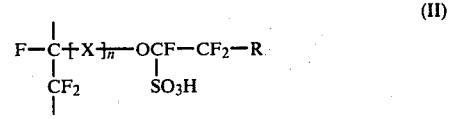
(II)

and

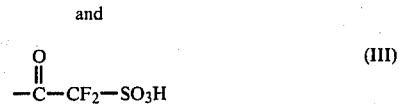
(III)

wherein n is 0, 1 or 2; R is selected from fluorine and perfluoroalkyl radicals having from 1 to 10 carbon atoms; and X is selected from the group consisting of:

[O(CF$_2$)$_m$], [OCF$_2$CFY] and [OCFYCH$_2$]

where m is an integer of from 2 to 10 and Y is selected from the class consisting of fluorine and trifluoromethyl.

In a preferred embodiment, n is 1 or 2, Y is a trifluoromethyl radical, R is fluorine, and m is 2. Catalysts of the above formulae typically have a molecular weight of between about 1,000 and 500,000.

Polymeric catalysts within the above formulae may be prepared in various ways. One method, disclosed in U.S. Pat. No. 3,282,875 and in U.S. Pat. No. 3,882,093, comprises polymerizing vinyl compounds of the formula:

$$CF_2=CF[X]_nOCF_2CFRSO_2F \quad (IV)$$

or $$CF_2=CF[X]_nOCFSO_2FCF_2R \quad (V)$$

wherein R, X and n have the meanings given to them above, in a perfluorocarbon solvent using a perfluorinated free radical initiator. The products are homopolymers of the compounds (IV) or (V) with repeating moieties of formula (I) or (II) or copolymers of both with recurring moieties of the same formulae (I) and (II). Since the vinyl ethers (IV) and (V) are liquid at reaction conditions, it is further possible to polymerize and copolymerize them in bulk without the use of a solvent. Polymerization temperatures vary from −50° to +200° C. depending on the initiator used. Pressure is not critical and is generally employed to control the ratio of the gaseous comonomer to the fluorocarbon vinyl ether. Suitable fluorocarbon solvents are known in the art and are generally perfluoroalkanes or perfluorocycloalkanes, such as perfluoroheptane or perfluorodimethylcyclobutane. Similarly, perfluorinated initiators are known in the art and include perfluoroperoxides and nitrogen fluorides. It is also possible to polymerize the vinyl ethers of formula (IV) or (V) in an aqueous medium using a peroxide or a redox initiator. The polymerization methods employed correspond to those established in the art for the polymerization of tetrafluoroethylene in aqueous media. The sulfonyl groups on the polymer may then be converted to sulfonic acid groups by known methods such as by contact with anhydrous or hydrous ammonia.

It is also possible to prepare catalyts for the present invention from the product of copolymerizing the vinyl ethers of formula (IV) or (V) with perfluoroethylene and/or perfluoroalpha-olefins. A preferred copolymer is prepared by polymerizing perfluoroethylene (tetrafluoroethylene) with a perfluorovinyl ether containing attached sulfonyl acid groups such as perfluoro-3,6-dioxa-4-methyl-7-octensulfonic acid, followed by conversion to the corresponding sulfonic acid would have recurring groups of the formula:

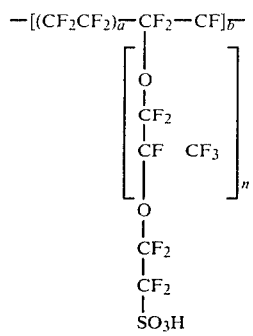

wherein a is an integer of from 5 to 13.5, inclusive; b is such that the polymer of formula (VI) has a molecular weight of circa 1000; n is as defined above and the ratio of a over b varies from about 2 to about 50. The polymer of formula (VI) is available commercially under the tradename of NAFION ® resin (E. I. DuPont De Nemours and Company, Wilmington, Del.; see bulletin Z-189 dated 6/30/1978). Catalysts of the above-noted formula (VI) offer the advantages of high concentrations of accessible acid groups in a solid phase.

Another class of preferred catalyst for use in the method of the invention comprises copolymers of the compounds of formulae (IV) and (V) given above with a silane monomer such as triethoxyvinyl silane and the like. The copolymerization may be carried out as described above, according to the schematic formulae:

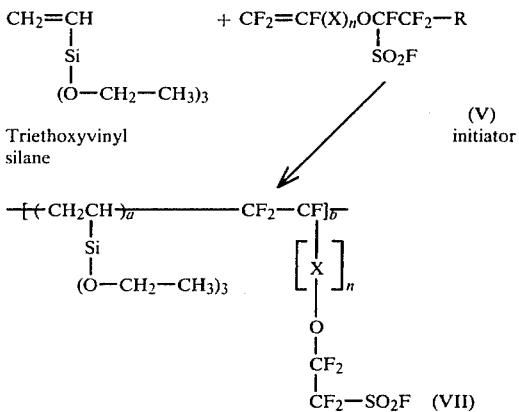

wherein a, n, b and X have the meaning previously ascribed to them, and the component of formula (V) is used as representative of the compounds (IV) and (V). The product polymer of formula (VII) may be further reacted with silica to remove ethanol and to give a perfluorinated sulfonic acid of the formula:

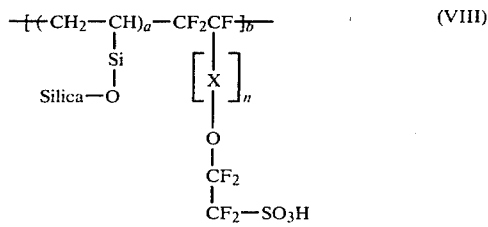

wherein a, n, x and b are as defined above.

Another example of an insoluble catalyst useful in the method of the invention is one wherein a perfluoroorganosulfonyl fluoride is attached to an organic polymer containing reactive aromatic groups. Such an attachment may be represented by the schematic formulae:

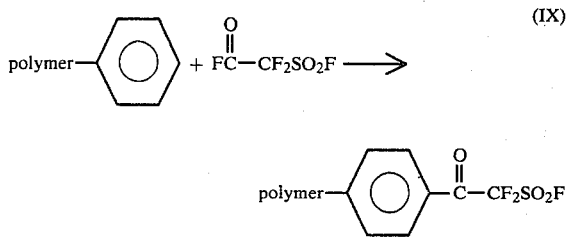

The reaction is carried out in the presence of anhydrous antimony pentafluoride or boron trifluoride. Acid hydrolysis of the product sulfonyl fluoride of formula (IX) will then give the corresponding polymer bound perfluorosulfonic acid group.

The catalyst employed in the present invention is advantageously a solid under reaction conditions. The catalyst broadly comprises a perfluorinated polymer having acid groups in the amount of about 0.01 to 5 mequiv/gram catalyst. Preferably, the polymer contains about 0.05 to 2 mequiv/gram of acid groups.

Advantageously the catalyst is used in a dried form, i.e.; substantially free of water.

The catalyst used in the present invention may be supported on a porous, solid inert support. The supported catalysts possess greater activity per unit of acid present than do the unsupported catalysts. By porous solid support is meant an inert support material having a porous structure and an average pore diameter of between about 50 Å and about 600 Å or higher. Preferably, the average pore diameter of the support is greater than about 200 Å. The porous solid support of the subject invention is preferably selected from the inorganic oxide group consisting of alumina, fluorided alumina, zirconia, silica, silica-alumina, magnesia, chromia, boria, and mixtures and combinations thereof. Other porous, solid supports may also be used such as bauxite, kieselguhr, kaolin, bentonite, diatomaceous earth and the like. Other porous solid supports such as polytetrafluoroethylene, carbon, e.g., charcoal, polytrichlorofluoroethylene, porous glass, and the like may also be used. Basically, the support should be substantially inert to the catalyst, and be insoluble in the reaction mixture under reaction conditions.

The average pore diameter (also known as effective pore diameter) of the support, which is related to the ratio of pore volume to surface area, is an important consideration in the choice of support. Generally, as the average pore diameter of the support is increased, the activity of the catalyst is increased. Most preferably, the support should possess both a high surface area and a high average pore diameter.

The weight ratio of catalyst to support may vary from about 0.1:100 to about 30:100, preferably from about 1:100 to about 15:100. The support is preferably impregnated with the catalyst by dissolving the catalyst in a solvent, such as ethanol, mixing the support and the catalyst solution, and then drying the impregnated support under vacuum at a temperature of between about 25° C. and about 100° C. so as to remove the solvent.

Rosins which are advantageously polymerized by the method of the invention are represented by tall oil rosin, wood rosin and gum rosin.

Polymerization of the rosins are carried out by heating the rosin to a temperature of from about 60° C. to about 180° C., preferably 90° C. to 150° C., in the presence of a catalytic proportion of a polymeric fluorocarbon as described above.

A catalytic proportion of the catalyst is one which promotes the desired polymerization. In general, a catalytic proportion for batch polymerizations will be one within the range of from about 0.01 percent to about 20 percent or more by weight of the rosin. Higher proportions are not generally required and only add to the expense of the process. Higher proportions tend to speed the polymerization reaction. Of course, in carrying out a continuous polymerization, the concentration of catalyst in a given amount of rosin will be higher than required in a batch procedure.

The polymerization may be carried out neat or in the presence of a solvent for the rosin. A wide variety of solvents may be employed. One class of solvents which may be employed are inert solvents, i.e.; solvents which do not enter into or otherwise adversely affect the desired course of the polymerization. Representative of inert solvents are the hydrocarbon solvents.

Representative of hydrocarbon solvents which may be employed are benzene, xylene, mineral spirits, cyclohexane and the like; halogenated hydrocarbons such as carbon tetrachloride, ethylene dichloride and the like.

Another class of solvent which may be employed are the cyclic terpenes. The term "cyclic terpene" as used herein means the monocyclic hydrocarbons corresponding to the formula $C_{10}H_{16}$ and having two centers of reactivity, such as d-limonene, dipentene, terpinolene, terpinene and the like or bicyclic hydrocarbons such as alpha-pinene and beta-pinene which are bicyclic terpenes containing one double bond. All of the cyclic terpenes are useful solvents in the method of the invention, but the dipentenes are particularly useful. The cyclic terpenes are not, of course, inert solvents but will in fact homopolymerize and also copolymerize to a small degree with the rosin components. This small amount of copolymerization is not disadvantageous for many uses of the product polymerizate. The reaction product obtained by polymerizing a solution of tall oil rosin in cyclic terpene solvent exhibits a very high degree of crystallization resistance, pale color and improved odor.

The proportion of solvent employed in the method of the invention is not critical and any proportion may be used which will facilitate the desired reaction.

In the method of the invention, bleaching clays and filter aids my be added to the reaction mixture for improved product color.

The rosin may be polymerized according to the method of the invention, employing conventional reaction apparatus and means for admixing in the catalyst. During polymerization, a slight exotherm may be noted and conventional cooling means may be used, when desired, to maintain a constant temperature of the reaction mixture.

The process may be carried out either as a batch or continuous type of operation, although it is preferred to carry out the process continuously. It has generally been established that the more intimate the contact between the feedstock and the catalyst, the better the yield of desired product obtained. With this in mind, the present process, when operated as a batch operation, is characterized by the use of mechanical stirring or shaking of the reactant and catalyst.

When employing a continuous process, the feedstocks may be contacted with the catalyst in any suitable reactor. In one embodiment, the catalyst is packed in a vertical, tubular reactor bed with inert supports, such as ceramic balls or silicon carbide, above and below the catalyst to prevent entrainment of the solid catalyst. In a further embodiment, the catalyst is mixed with an inert material, such as quartz, and loaded in the reactor so as to improve the fluid dynamics of the system. The flow of the reactant feed stream may be upflow or downflow, with an upflow arrangement being preferred to ensure a liquid phase reaction. Alternatively, the catalyst particles may be used in a fluidized bed or the catalyst may be formed into a tube or membrane.

The course of the polymerization may be followed using conventional analytical techniques to determine the degree of polymerization such as by observing the disappearance of the peak in the ultraviolet spectrum of abietic acid or by observing the dimer product formation using gel permeation chromatography as described below. In general, the polymerization reaction is complete within about one-quarter to one-half hour. Upon completion of the polymerization reaction, the product polymerized rosin may be separated from the solid catalyst by simple filtration or like conventional techniques and re-used. The separated catalyst may also be washed successively with acetone and water and then acetone and re-used a plurality of times or may be washed with acids such as hydrochloric, followed by water washing and then re-used.

The following examples describe the manner and the process of making and using the invention and set forth the best mode contemplated by the inventors of carrying out the invention but are not to be considered as limiting. Dimer acid content was determined by gel permeation chromatography using Bio beads SX-2 solid phase and tetrahydrofuran solvent. All parts are by weight unless otherwise indicated.

PREPARATION 1

An appropriate vessel was charged with a quantity of Nafion ® XR resin (K⊕ form; E. I. DuPont De Nemours, Wilmington, Del.) particles and an equal weight of 4N hydrochloric acid. The charge was stirred at room temperature for 4 hours. At the end of this period the resin was separated by filtration and washed with water. The above procedure was repeated 4 additional times to obtain more than 95 percent conversion of the resin to the H⊕ form. The resin was then washed with water and dried in a vacuum oven at a temperature of 80°–90° C. The resin catalyst contains about 0.83 meq. of acid per gram of catalyst.

The structure for the resulting catalyst is exemplified by the formula (VI) given above wherein n is 1.

PREPARATION 2

A polymeric perfluorotriethoxysilane is prepared as follows.

A stainless steel autoclave is charged with deionized water, di-tertiary-butylperoxide and perfluoro-3,6-dioxa-4-methyl-7-octensulfonic acid in equal weight proportions. The autoclave is sealed, evacuated, and then charged with vinyltriethoxysilane by transfer in vacuo. The autoclave is placed in an electrical heating jacket and held at 123°–125° C. for 18.5 hours. Maximum pressure is reached after the first 2 hours of heating and the pressure decreases as the polymerization proceeds.

After the reaction period, the autoclave is cooled, vented, and opened. The contents consist of precipitated copolymer suspended in a liquid phase. The copolymer is vacuum filtered, washed with ethanol, and then distilled water. It is dried in a vacuum oven at 60° C.

The dried copolymer is then mixed with silica having an average pore diameter of between 50 Å and about 600 Å and the resultant intimate mixture is heated until 3 moles of ethanol per mole of copolymer are collected. The resultant material consists of a perfluorinated sulfonic acid moiety bound to silica and having a formula within the scope of the formula (VIII) given above.

PREPARATION 3

A series of resins (styrene-divinyl benzene resins which contain 1 to 12% divinylbenzene) are swollen in a toluene solution at 100° under nitrogen in a 450 ml Parr reactor. These swollen resins are then acylated with

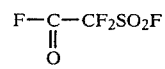

in the presence of anhydrous antimony pentafluoride or boron trifluoride. The reaction is conducted in a 450 ml Parr reactor at 100° for 24 hours. The solvent is decanted, and the polymer beads are extracted (Soxhlet) for 24 hrs. with benzene under nitrogen to remove unreacted unbound catalyst from the resin. The total amount of catalyst bound is determined in the usual way after conversion to the acid form. By controlling the degree of swelling of the resins, a size selectivity could be conferred on the catalyst system by the polymer. The same type reaction is carried out with sulfonyl fluoride adducts.

EXAMPLE 1–4

In four separate runs, an appropriate vessel was charged with a solution of tall oil rosin in toluene (50:50 w/w). To the solution there was added with stirring 1–4 percent by weight of the resin particles prepared in accordance with Preparation 1, supra. The resulting mixture was heated to reaction temperature and maintained at that temperature for a period of from 4 to 6 hours. During this period, analysis of the reaction mixture showed that polymerization was generally at a maximum point within 15 minutes after reaching the reaction temperature. The product dimer was separated by filtering off the solid catalyst and stripping away the solvent by distillation.

The temperature of the reaction mixture, softening point of the product dimerized rosin and its dimer content are given in Table I, below.

TABLE I

| EXAMPLE | REACTION TEMPERATURE (°C.) | CATALYST AS A % OF ROSIN | SOFTENING POINT (°C.) | PERCENT DIMER BY GPC |
|---|---|---|---|---|
| 1 | 45–50 | 4 | 83 | 18.8 |
| 2 | 110 | 4 | 91 | 31.9 |
| 3 | 110 | 1 | 112 | 33.0 |
| 4 | 115 | 1 | 96 | 29.4 |

EXAMPLES 5-6

The procedure of Examples 1-4, above, are repeated two additional times, once wherein the solvent is replaced with a mixture of mineral spirits/xylene (60:40 v/v). In Example 5, the catalyst recovered from Example 1, supra., was used after washing with acetone, then water and then acetone. In Example 6, the catalyst recovered from Example 5 supra., was used after washing with acetone, water and then acetone. The results are shown in Table II, below.

TABLE II

| EXAMPLE | REACTION TEMP. (°C.) | SOLVENT | SOFTENING POINT (°C.) | PERCENT DIMER |
|---|---|---|---|---|
| 5 | 100-105 | Toluene | 98 | 35.9 |
| 6 | 110-115 | Xylene/Mineral Spirits | 84 | 26.2 |

EXAMPLE 7

A reactor was constructed so as to have a stainless steel coil which contains a section of NAFION-H (DuPont, supra.) tubing of 2.75 MM ID and 3.125 MM OD and approximately 6 feet in length (9.75 gm). The Nafion-H has an equivalent weight of 1100. This was immersed in an oil bath equipped with a temperature controller and stirrer. The oil bath was maintained at a temperature of 125°-130° C. A solution of rosin in toluene (50/50 w/w) was passed through a preheater which was maintained at a temperature of 120°-125° C. before it contacts the NAFION tube. A flow rate of 3.7 ml min$^{-1}$ was employed. The dimerized product was passed through an in-line filter prior to collection. Analysis shows the product exiting from the reactor contained 22.9% rosin dimer.

EXAMPLE 8

A column was packed with two grams of NAFION-H powder (DuPont, supra.) resting on approximately 2 cm of glass wool. The column was heated with steam so that the temperature of the NAFION-H was 100° C. A solution of rosin in toluene (50/50, w/w) was then added at such a rate that it had a residence time in the NAFION-H section of the column, of approximately 15 minutes. Analysis of the effluent from the reactor by liquid chromatography shows it to contain 25.1% rosin dimer.

EXAMPLE 9

A solution of rosin in toluene (50/50, w/w) is passed over a catalyst prepared as described in Preparation 2, supra., at a rate so as to have a residence time of between 10-15 minutes in the catalyst section of the reactor which is maintained at 110°-120° C. Analysis of the effluent from the reactor by liquid chromatography shows it to contain over 10% rosin dimer.

EXAMPLE 10

A solution of rosin in toluene (50/50, w/w) is stirred at 110° C. with a catalyst prepared as described in Preparation 3, supra. After a period of six hours, the reaction mixture is cooled and the polymer bound perfluororganosulfonic acid catalyst is removed via filtration. Analysis of the filtrate by liquid chromatography shows it to contain over 10% rosin dimer.

EXAMPLE 11

A five-hundred ml 3-necked flask equipped with a stirrer, dropping funnel and thermocouple was charged with a suspension of a sulfonated copolymer of styrene and divinyl benzene in bead form having a diameter of from about 400-16 mesh. (Amberlyst 15; Rohm & Haas Corporation) in toluene. This mixture was heated to reflux temperature (110° C.) and a solution of tall oil rosin in toluene (50:50 w/w) was added dropwise over a period of 30 minutes. The resulting mixture was then maintained at reaction temperature for a period of from 4 to 6 hours. The product dimer was separated by filtering off the solid catalyst and stripping away the solvent by distillation. Analysis of the residue by liquid chromatography showed it to contain 28.4% rosin dimer. Using 10% by weight of Amberlyst 15 under the same conditions, the product was found to contain 18.7% rosin dimer.

We have described above the process conditions which are preferred and disclosed its essential features. From this it can be seen that the method of the invention offers many advantages over the previous art. This process is far less corrosive to stainless steel than those processes using strong acids and salts such as boron trifluoride, hydrochloric acid, zinc chloride, aluminum chloride and similar catalysts. Many of these prior art catalysts are known to cause stress crack corrosion in stainless steel. The catalyst used in the method of the present invention may be used under the conditions described, in much smaller amounts than most of the acids and acidic salts used in the prior art. They are less prone to cause rosin to decarboxylate and produce sludge. The process of this invention is also notable in that it may be conducted at a relatively high temperature (which facilitates rapid removal of exothermic heat and fast reaction times). It also obviates a need for the use of a processing solvent which is almost invariably used in the present state of the art and results in low kettle yield compared to the improved process of the invention. Other important advantages will be apparent to one skilled in the art.

What is claimed:

1. The polymerization of a rosin in the presence of a catalytic proportion of an insoluble catalyst which comprises a polymer having pendant organosulfonic acid groups.

2. The polymerization of claim 1 wherein the catalyst contains recurring groups selected from those of the formulae:

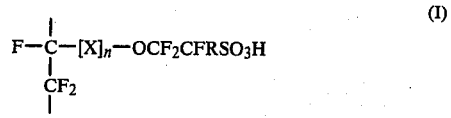

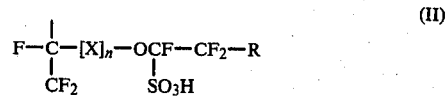

and

wherein n is 0, 1 or 2; R is selected from the group consisting of fluorine and perfluoroalkyl radicals having from 1 to 10 carbon atoms; and X is selected from the group consisting of:

[O(CF$_2$)$_m$], [OCF$_2$CFY] and [OCFYCF$_2$]

where m is an integer of from 2 to 10 and Y is selected from the group consisting of fluorine and trifluoromethyl.

3. The polymerization of claim 1 wherein said catalyst has the general formula:

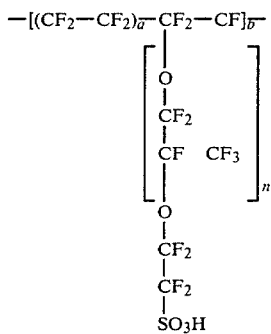

wherein n equals 1 or 2; a is an integer of from 5 to 13.5 and the ratio of a over b varies from about 2 to about 50; and b is such that the polymer has a molecular weight of circa 1000.

4. The polymerization of claim 1 wherein said catalyst has the general formula:

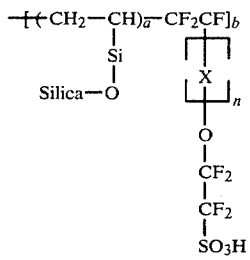

wherein n is 0, 1 or 2; the ratio of a over b varies from about 2 to about 50 and b is such that the polymer has a molecular weight of circa 1000.

5. The polymerization of claim 1, wherein said catalyst has the general formula:

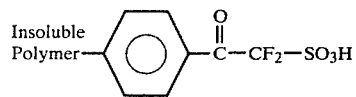

6. The polymerization of claim 1 wherein said catalyst has the general formula:

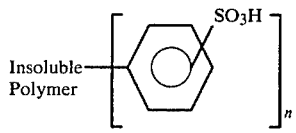

wherein n is an integer of at least 1.

7. The polymerization of claim 1 wherein the catalyst is a sulfonated styrene-divinylbenzene copolymer.

8. The polymerization of claim 1 wherein the rosin is selected from the group consisting of tall oil rosin, wood rosin and gum rosin.

9. The polymerization of claim 8 wherein the rosin is tall oil rosin.

10. The polymerization of claim 8 wherein the rosin is wood rosin.

11. The polymerization of claim 8 wherein the rosin is gum rosin.

12. The polymerization of claim 1 wherein the catalytic proportion is from about 0.01 to about 20 percent by weight of the rosin.

13. The polymerization of claim 12 wherein the proportion is about 20 percent.

14. The polymerization of claim 1 wherein the polymerization is carried out in an inert solvent.

15. The polymerization of claim 1 carried out in a cyclic terpene solvent.

16. The polymerization of claim 1 wherein the catalyst is supported on an inert porous carrier having an average pore diameter of between about 50 Å and about 600 Å in a weight ratio of catalyst to support of between about 0.1:100 and about 20:100.

17. The polymerization of claim 16 wherein said carrier is selected from the group consisting of alumina, silica, silica-alumina and porous glass.

18. The polymerization of claim 1 carried out at a temperature of from about 60° C. to about 180° C.

19. The polymerization of claim 1 wherein the catalyst is present in a continuous reactor zone and the rosin is passed continuously into said zone while product polymer is passed continuously from said zone.

* * * * *